United States Patent [19]

Gamble, Jr. et al.

[11] 4,014,815

[45] Mar. 29, 1977

[54] REMOVAL OF CARBON AND VANADIUM OR LEAD FROM SPENT CATALYSTS BY MEANS OF CONTROLLED HIGH TEMPERATURE TREATMENT WITH SULFUR

[75] Inventors: Fred R. Gamble, Jr., Murray Hill, N.J.; Ricardo B. Levy, Los Altos, Calif.

[73] Assignee: Exxon Research and Engineering Company, Linden, N.J.

[22] Filed: June 19, 1975

[21] Appl. No.: 588,401

[52] U.S. Cl. .......................... 252/412; 252/411 R
[51] Int. Cl.² ......................................... B01J 37/00
[58] Field of Search ......... 252/411 R, 412; 423/62, 423/444, 561

[56] References Cited

UNITED STATES PATENTS

| | | | |
|---|---|---|---|
| 2,370,707 | 3/1945 | Archibald | 252/411 R X |
| 3,151,059 | 9/1964 | Foster | 252/411 R X |
| 3,635,838 | 1/1972 | Gatsis | 423/444 X |
| 3,645,912 | 2/1972 | Gatsis | 252/411 R |

*Primary Examiner*—Patrick P. Garvin
*Assistant Examiner*—William G. Wright
*Attorney, Agent, or Firm*—Joseph J. Allocca

[57] ABSTRACT

The regeneration of spent metal catalysts is accomplished by treatment with a sulfurous atmosphere at a pressure of at least 0.10 atmospheres and at a controlled high temperature of between 400–825° C. (preferably between 400°–715° C., and most preferably between 400°–600° C.) for a time sufficient for the selective formation of sulfides of carbon and sulfides of vanadium or lead which sulfides are characterized by having high volatility and solubility in the sulfurous atmosphere and which vanadium and carbon sulfides are selectively removed from the catalyst within the stated temperature range.

The coke and vanadium or lead removal methods disclosed are selective in that the coke and vanadium or lead are removed without removing the active catalytic components.

24 Claims, 3 Drawing Figures

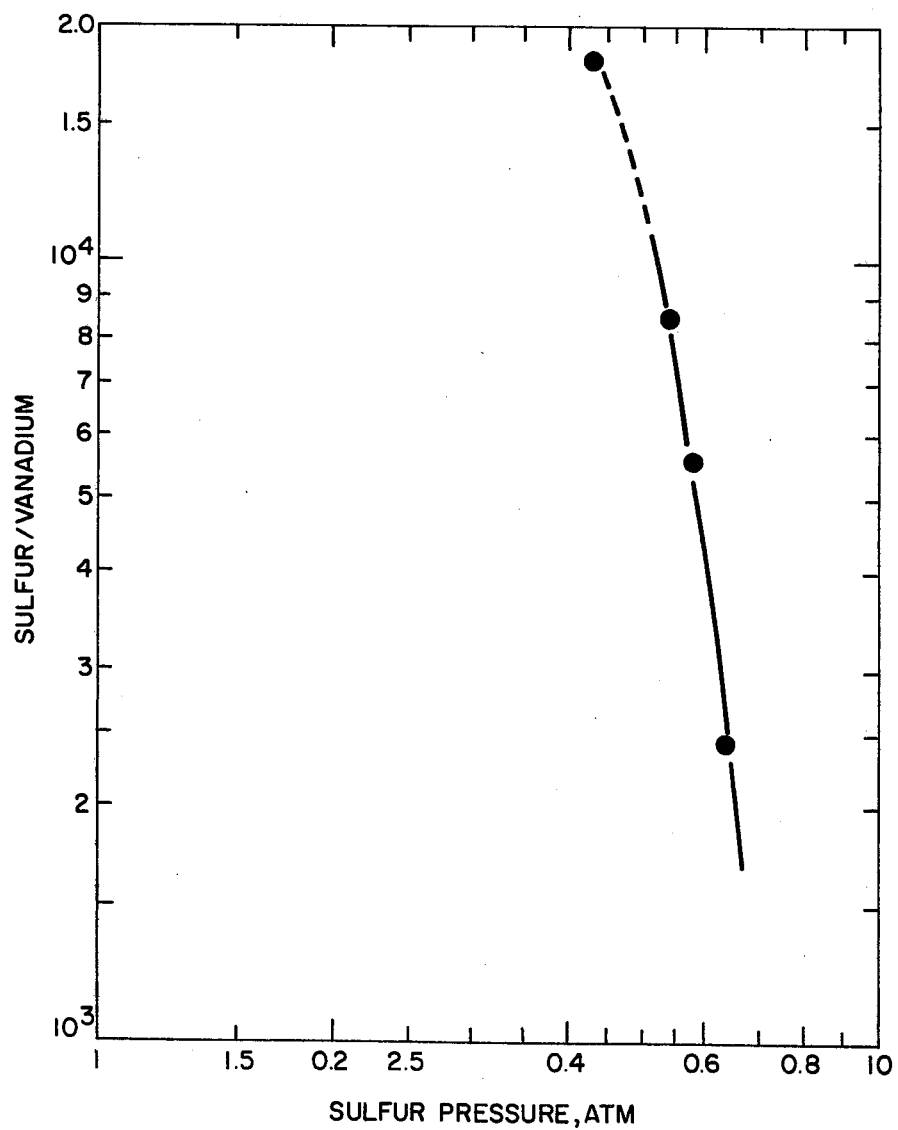
FIGURE A

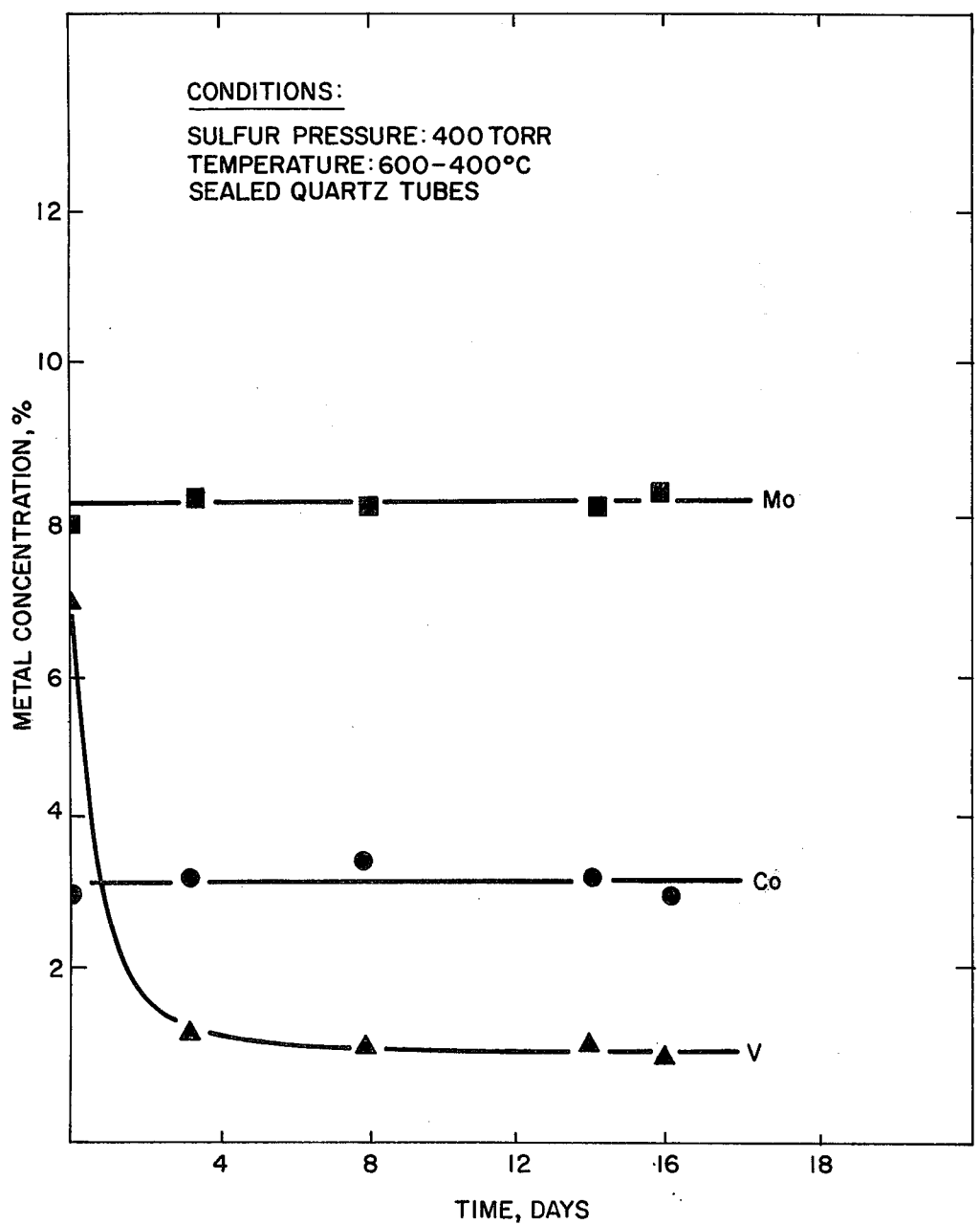

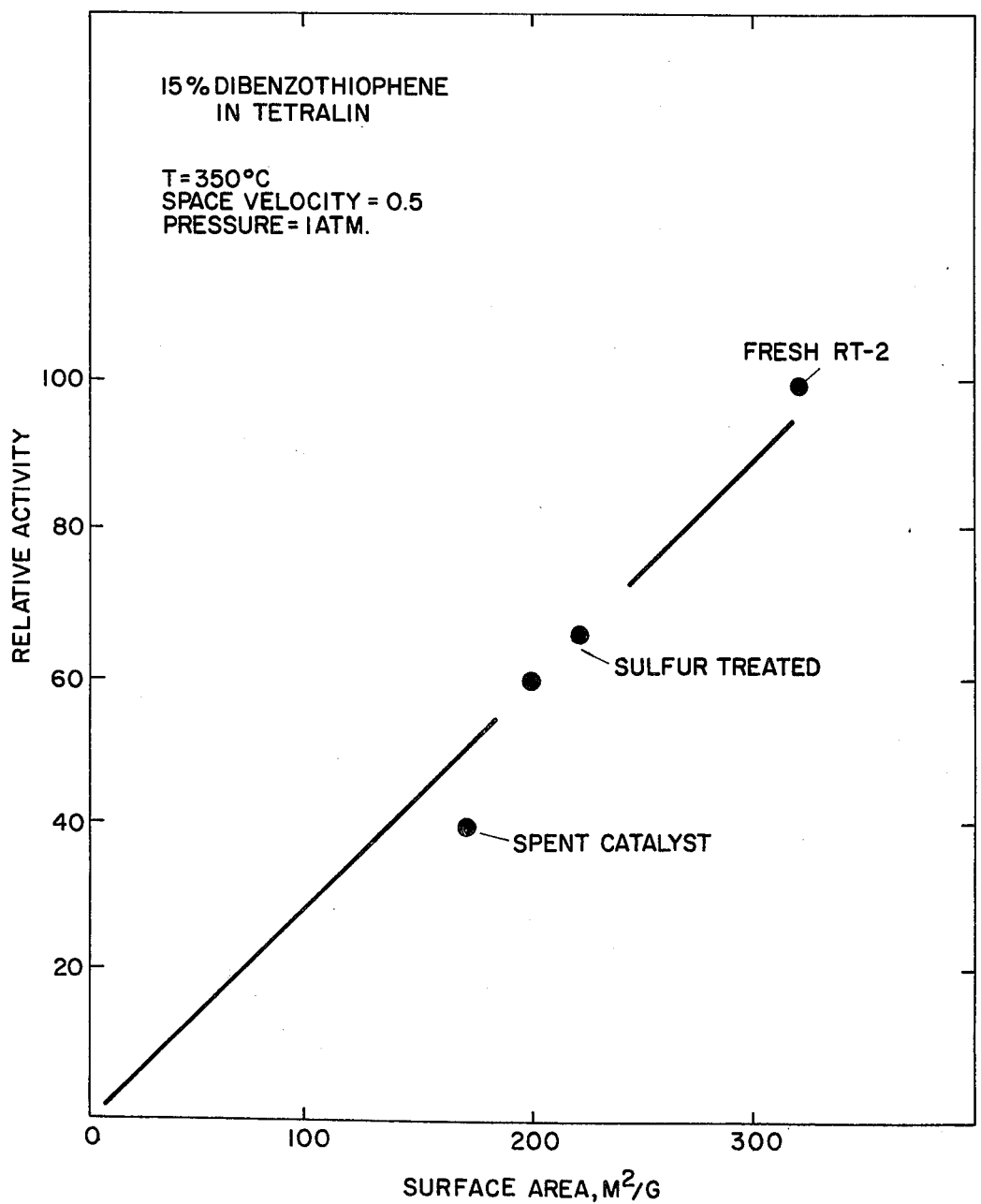

REMOVAL OF CARBON AND VANADIUM OR LEAD FROM SPENT CATALYSTS BY MEANS OF CONTROLLED HIGH TEMPERATURE TREATMENT WITH SULFUR

BACKGROUND OF THE INVENTION

Catalytically promoted methods for the conversion of crude hydrocarbons into commercial products include cracking, hydrocracking, reforming, hydroforming, coking, desulfurizing, denitrogenation, etc. Such reactions generally are performed at elevated temperatures, for example, about 150° to 750° C., more often 300°–650° C. Feedstocks for these processes normally comprise liquid and solid hydrocarbons which at the temperature of the conversion reaction are generally in the fluid, i.e., liquid or vapor state and the products of the conversion frequently are lower boiling materials. In particular, hydrogen treating of hydrocarbons is widely practiced and typically uses a catalyst consisting of cobalt and molybdenum supported on alumina.

The typical feedstock subject to catalytic conversion contains a variety of metals, one being vanadium. These metals, present in the feedstock, deposit on the catalyst and as a consequence catalytic activity and efficiency is lost. These metals deposit as a nonvolatile compound on the catalyst during the conversion process so that the standard regeneration processes practiced to remove coke do not remove these metals. Also, removal of coke by high temperature treatment with oxygen cannot be done since such treatment in the presence of vanadium reduces the catalytic surface area.

Metal poisoning of cracking catalysts is a major cost item in present day refining and is a bottleneck in upgrading residual stocks. Current methods of combating metal poisoning are careful preparation of feedstocks to keep metal content low and periodic replacement of catalyst to control metal levels on the catalyst. This method of controlling metal levels by catalyst replacement, however, is marked by substantial increased costs per unit of product produced.

Catalysts used commercially are the result of years of study and research into the nature of the hydrogen treating process, and the costs are not negligible. Thus, catalyst cost frequently dictates the nature of the feedstream used. Feedstocks, which are plentiful but which have high metal content, are frequently avoided merely because their use would dictate frequent changes of expensive catalyst.

To reduce this cost, alternative methods for controlling metal poison concentration on catalysts are demetallization processes which avoid the step of catalyst discard and, therefore, circumvent any objection to the use of these plentiful, but metal contaminated, petroleum feedstreams.

However, in practicing demetallization, it is imperative that the process utilized is not complicated or requires the setting up of apparatus equivalent to that used in original catalyst manufacture. It is also an essential criterion that the contaminating components be removed without removing the expensive catalytic components.

PRIOR ART

Demetallization has received considerable attention in the prior art. Numerous schemes have been devised for the removal of metal contaminants from catalysts and/or for the separation of metals from various substrates, carriers and ores.

U.S. Pat. No. 1,606,343 teaches a process for recovering tin, bismuth, molybdenum and other metals from ores, concentrates, drosses, scrapes and the like. The metals are recovered by the formation of volatile compounds with sulfur. The invention is commonly practiced at a temperature of 800° C. and consists of treatment of the subject material with a gas made up of 3 to 15 parts inert gas or $H_2O$ to one part of a sulfur compound such as elemental sulfur or $H_2S$. The patent, while directed to numerous metals only gave examples of extraction of tin from ores and did not demonstrate selectivity in removal of metals nor was the process directed to catalyst regeneration, i.e. removal of contaminants without reduction or removal of the metals which make up the catalyst.

U.S. Pat. No. 3,122,511 teaches a multistep process for removing vanadium and nickel from a refractory oxide cracking catalyst. The catalyst is removed from the catalytic chamber treated with $CS_2$, $H_2S$ or elemental S gas at from 500°–1500° F, the sulfidings gas is purged by use of $N_2$, and the catalyst is then chlorinated and finally washed-dried. The sulfiding step in the examples utilizes $H_2S$ gas which, at the pressure stated, is not as good a sulfiding agent as elemental sulfur. Further, the $N_2$ purge flushes the sulfiding gas from the system and leaves the metal sulfides on the catalyst surface, the demetallization being performed by the chlorination and wash steps of the invention. For vanadium sulfides to be volatile, a sulfur atmosphere is necessary.

U.S. Pat. No. 2,709,639 teaches a process for the manufacture of carbon disulfide which includes a step for catalyst regeneration consisting of passing sulfur vapors diluted with nitrogen at about 600° C. over a contaminated silica gel or alumina catalyst to remove coke. The materials used in the initial carbon disulfide manufacture process are sulfur and gaseous light hydrocarbons such as methane, ethane, propane, butane and some pentanes. These hydrocarbons do not carry vanadium metal with them and, therefore, no vanadium is deposited in the catalyst by the process. Further, the catalyst used is an oxide, not a transition metal based catalyst.

U.S. Pat. No. 3,122,510 teaches a process for removing vanadium, nickel and iron from solid oxide hydrocarbon conversion catalysts. The process is practiced by removing the catalyst from the system, sulfiding the catalyst with a sulfiding agent at a temperature of from 260° to 810° C., chlorinating the sulfided catalyst, removing the metal contaminants from the chlorinating agent treated catalyst by washing the catalyst with an aqueous medium and returning the catalyst to the conversion unit. The sulfiding step is used so as to facilitate removal of iron and nickel from the catalyst. The sulfiding agent, which may be elemental sulfur vapor, $H_2S$, $CS_2$ or a mercaptan at a pressure of from 0.10 to 30.0 atm. at a temperature of from 260° to 810° C. This sulfiding converts metal ions into metal sulfides which congregate and concentrate on the catalyst surface. The patent, however, does not teach that vanadium may be selectively removed from a catalyst which contains other transition metal based catalyst components since it deals only with a refractory oxide catalyst. It also does not show that sulfides move across a temperature gradient, since no gradient is established, nor does it show that vanadium sulfides may be selectively removed from a metal catalyst by entrainment in a moving sulfurous atmosphere or by selective dissolution in liquid sulfur.

"Journal of the Less Common Metals" 16, 290(1968) reports the doctoral dissertation of F. Wehmeier at Westfolischen Wilhelms Universita at Munich 1961, which describes the chemical transport of metal sulfides by means of iodine. The thesis discloses control runs made without iodine and demonstrates that numerous metals are transported in a temperature gradient even in the absence of iodine. The conclusion was drawn that heretofore unknown gaseous sulfides exist. The temperature gradient at which these volatile sulfides were observed was usually 800°–700° C. In the most extreme cases, $TaS_2$ moved at 580°–500° C and $Cr_2S_3$ moved at 1020°–890° C. However, as far as most of the reported metals are concerned, the temperature gradient was on the order of 900°–700° C. one experiment with cobalt being run at 720°–640° C. showing transport, an experiment with molybdenum being run at 850°–650° C. showing transport, and an experiment with vanadium being run at 810°–780° C. showing transport of a volatile material. In general, however, no demonstration of selectivity or temperature criticality was made.

It has been unexpectedly discovered that at temperatures at which carbon forms a stable volatile moiety such as $CS_2$, vanadium also forms a stable volatile moiety which can be removed selectively from certain metal catalysts without removing the active metal catalyst itself. The metal catalysts which may be treated by the selective vanadium and carbon removal process of the instant invention are those supported catalysts having Group VI or VIII, Ni, Co, W, Mo and bi or tri combinations thereof. The metals may be in elemental oxide or sulfide form or in combination thereof. The support may be any refractory oxide or other inert support, preferably alumina. Removal of vanadium is a highly desirous result since an increase in catalyst activity and selectivity is achieved by means of reducing the vanadium content of the catalyst. In one stroke, it is possible to both remove carbon from the catalyst and remove the material which is one of the catalyst deactivating agents. Since catalyst activity is also lost by carbon deposits, removal of carbon by this method is doubly beneficial.

Spent cobalt-molybdenum on $Al_2O_3$ catalysts are contaminated with lower sulfides of vanadium and nickel. They are also highly coked which reduces their surface area and drastically reduces their catalytic activity. Conventional means of decoking such as high temperature reaction in oxygen are unavailable, since oxidation in the presence of vanadium reduces the surface area of the catalyst.

It has been discovered, and forms the basis of this invention, that vanadium and coke form sulfides, which are volatile when contacted at a temperature between 400°–825° C. with a sulfurous atmosphere, which sulfides may be selectively removed from metal catalysts such as supported cobalt-molybdenum catalysts by means of entrainment in a moving sulfur gas atmosphere; by chemical vapor transport across a temperature gradient, by solubilizing in liquid sulfur at between 300°–825° C. or by heating in a static atmosphere of elemental sulfur gas at between 400°–825° C. which facilitates the growth of vanadium sulfide crystals on the surface of the catalyst thus selectively removing vanadium from the catalyst pores. These crystals may then be removed by dissolving them with a chemical reagent such as acid (oxalic, HCl, etc.) in aqueous solution if the pores are first filled with a liquid that inhibits contact between the acid and the active catalyst metals, (i.e. Co/Mo). The liquid placed in the pores is preferably one that is immiscible with water and in which the active chemical reagent is insoluble. After the vanadium sulfide crystals have been insoluble. After the vanadium sulfide crystals have been dissolved the intra-pore liquid is removed by heating. A suitable liquid would be a petroleum feedstock. As used in this specification and in the accompanying claims, by sulfurous atmosphere is meant either an atmosphere of liquid elemental sulfur, or elemental sulfur vapor, or a gaseous sulfur atmosphere generated by any sulfur compound having a high equivalent sulfur pressure. Whenever one or the other is specifically intended, that intention is noted by appropriate language. As used in this specification and in the accompanying claims by metal catalysts are meant transition metals, transition metal oxides and transition metal sulfides. This removal is selective in that while vanadium and carbon sulfides are removed from the catalyst, little or no catalytically active metal is removed. The process is also characterized by a marked regeneration of catalyst surface area resulting in recovery of catalytic activity. Preferred temperature ranges from between 400°–715° C. and most preferably between 400°–600° C. The contacting of the instant invention can last from 5 minutes to two weeks, preferably 30 minutes to 72 hours, most preferably one hour to 24 hours. A sulfur pressure of at least 0.10 atm. is needed.

The phenomenon of formation of volatile metal sulfides has been known for some time. However, at no time was it demonstrated or observed that different metal sulfides behave differently depending upon the temperature at which they are subjected to treatment with a sulfurous atmosphere leading to formation of metal sulfides. The instant invention is directed to this unique phenomenon and to the novel discovery that certain volatile metal sulfides may be selectively transported across a temperature gradient and that by careful control of the upper temperature parameter, selectivity of removal and transport may be achieved. While many metals form volatile sulfides and such sulfides move across temperature gradients, the fact that this characteristic may be used to regenerate active metal catalyst systems by selective removal of metal contaminants was not recognized until now.

The invention demonstrates that chemical vapor transport of the volatile sulfide of metal contaminants is a practical, workable system since selectivity is achieved, meaning that only contaminants and not metal catalyst are removed by judicious choice and control of transport temperature. This invention demonstrates that at high temperatures and across a gradient of at least 50° C., vanadium sulfides volatilize between 400°–825° C. and transport, leading to regeneration of catalyst surface while leaving the active metal intact on the catalyst surface. A preferred temperature range is 400°–715° C. and a most preferred range is 400°–600° C. with a temperature difference across the gradient of at least 50° C.

This invention also utilizes the discovery of moderate temperature carbon an vanadium sulfide volatilization to remove such sulfides, without removal of active metal catalyst, by means of entrainment of the sulfides on a stream of elemental sulfur gas. The catalyst to be treated is subjected to elemental sulfur vapor at a constant temperature ranging from 400° to about 825° C. A preferred range is 400°–715° C. and most preferably 400°–600° C. The sulfur vapor is flowing over and through the catalyst on a carrier gas such as helium or nitrogen. Treatment of the catalyst with a sulfurous atmosphere followed by a flush with inert gas would not yield the same result since vanadium sulfides which are volatile within the operable temperature range, are so only when in a sulfur atmosphere. An inert gas purge as practiced in the prior art would remove the sulfur atmosphere and cause the formation of nonvolatile vanadium sulfides.

It is also possible to practice the instant invention by itilizing the solubility characteristic of vanadium sulfides and carbon sulfides in liquid sulfur. Contacting a supported metal catalyst with liquid sulfur at between 300°–825° C. at a pressure sufficiently high to maintain sulfur in the liquid state, selectively yields a vanadium sulfide which is soluble in liquid sulfur and may be removed without detriment to the metal catalyst. The liquid sulfur is contacted with the supported metal catalyst preferably at between 300°–400° C.

The phenomenon of selective chemical vapor transport can be used to decontaminate many different metal catalyst systems used for a broad variety of purposes. Automotive exhaust catalysts which utilize platinum for the oxidation of CO can be poisoned by lead. Selective chemical vapor transport can be used to remove the lead from the catalyst. Lead can be transported with sulfur as the transport agent at temperatures as low as 600° C. with no platinum transport occurring. The transport of lead took place in a 600° → 400° C. temperature gradient but successful transport can be achieved across a gradient having a temperature difference of as little as 50° across the gradient. In practice, the spent catalyst would be exposed to sulfur vapor at pressures between several Torr and ~10 atmospheres with 1 atmosphere being preferred at temperatures over 500° C., 600° C. being preferred. The natural transport of volatile sulfides across a temperature gradient can be utilized to remove the lead from the catalyst or a forced convection of a sulfur gas atmosphere over the catalyst may be used to remove the contamination.

The practice of this invention will be better understood by reference to the following examples, it being recognized that they are merely representative and are not intended as limitations on the invention.

EXAMPLE 1

Removal of Vanadium and Carbon from a Spent Catalyst

An early version of a cobalt molybdenum catalyst was selected for treatment after 30 months Gofining service in Amuay (Venezuela). The test catalyst had an initial weight composition of 3% Co and 8% Mo. The catalyst was initially treated by extraction with toluene in a soxhlet extractor and dried overnight at 250° C. in a helium stream. This catalyst thus treated was then subjected to sulfur vapor for 4.5 hours at 600° C. Sulfur flow was maintained at one atmosphere total gas pressure. Helium was used as a carrier gas. Sulfur vapor pressure was 0.6 atm. and helium flow was 5 cc/sec.

Before sulfur treatment the catalyst was analyzed as 12% carbon and 6.7% vanadium. After treatment, analysis showed 4% carbon and 6.1% vanadium.

Treatment of the catalyst with moving gaseous sulfur atmosphere reduced carbon by 66% and vanadium by 9%.

EXAMPLE 2

Effect of Sulfur Vapor Pressure on Vanadium Removal

Catalyst treatment is as above. All runs were conducted on 10 g samples. Treatment time was 80 minutes.

Based upon the average vanadium concentration across the catalyst bed and assuming uniform dispersion, the following values are obtained for the ratio of sulfur passed (S) to vanadium removed (V).

| Temperature | P Sulfur | S/V |
|---|---|---|
| 600° C. | ~0.43 atm | 18,000 |
| 591° C. | 0.54 atm | 8,500 |
| 600° C. | 0.58 atm | 5,500 |
| 602° C. | 0.64 atm | 2,400 |

It is readily seen that increased sulfur vapor pressure dramatically reduces the sulfur to vanadium ratio, more vanadium being moved per given unit of sulfur. The dramatic effect of pressure may be graphically seen by reference to FIG. A. It indicates that it is possible to increase vanadium removal by sulfur pressure control and since the pressure of sulfur can be increased by a factor of 20 at the indicated temperatures, increased vanadium removal without increasing temperature can be achieved.

EXAMPLE 3

Effect of Sulfur Vapor Pressure on C Removal

Catalyst treatment is as in Example 1. Runs were conducted at 600° C. for 80 minutes.

| P,atm | % C (remaining) | $C/C_o$ | Removed |
|---|---|---|---|
| 0.54 | 6.7 | 0.64 | 36% |
| 0.58 | 6.3 | 0.61 | 39% |
| 0.64 | 5.8 | 0.56 | 44% |

% C is that total amount of carbon based on total weight catalyst remaining after treatment. $C/C_o$ is the ratio of amount removed to amount initially on the catalyst. $C_o$ is 10.4% as used in this ratio. Increasing sulfur vapor pressure enhances contaminant removal, in this case carbon removal.

EXAMPLE 4

Effect of Time on Carbon Removal

Catalyst treatment is as in Example 1. Runs were conducted at ~600° C. and 0.58 atm sulfur.

| Time | T | % C (remaining) |
|---|---|---|
| 2 hrs. | ~600° C. | 7.4 |
| 3.3 hrs. | ~600° C. | 6.7 |
| 4 hrs. | ~600° C. | 6.5 |

% C is the amount of carbon, based on total weight catalyst, remaining on the catalyst after treatment. At a given temperature, increasing time increases the amount of carbon removed from the catalyst.

EXAMPLE 5

Effect of Temperature on Carbon Removal

Catalyst treatment is as in Example 1.

| Temp. °C. | Time | % C (remaining on catalyst) |
|---|---|---|
| 600 | 80 min. | 6.7 |
| 650 | 75 min. | 5.3 |
| 697 | 85 min. | 3.5 |

Increasing temperature enhances the removal of carbon.

EXAMPLE 6

Selectivity of Sulfur Treatment

Catalyst treatment is as in Example 1. The catalyst was pretreated by Soxhlet extraction with toluene and dried under vacuum for 1 hour.

The catalyst was placed in a quartz tube with excess elemental sulfur, evacuated and sealed. The tube was heated 10 days in a 600°–400° C. temperature gradient with the catalyst at the high temperature end of the tube. Sulfur pressure was 400 Torr.

| | Analysis revealed | | | |
|---|---|---|---|---|
| | V. | Co. | Mo. | Ni |
| Wa/Wb | .56 | 1.0 | .97 | .84 | where W is the weight percent of ash as determined by X-ray fluorescent emission; $a$ = after treatment; $b$ = before treatment.

The data demonstrates that in the given temperature range of 600°–400° C., sulfur chemical vapor transport removes vanadium sulfides from a cobalt-molybdenum catalyst without altering the Co-Mo concentrations.

When a smaller quantity is treated and better sulfur-catalyst contacting occurs, the removal of vanadium is found to be more efficient. FIG. B represents small sample runs which clearly show selective vanadium removal. Improved catalyst-sulfur vapor contacting increases the overall efficiency of decontamination.

EXAMPLE 7

Temperature Dependence of Vanadium Removal Selectivity

Catalyst samples treated as in Example 6, except that the hot end temperature was held at 715° C. or 825° C. and the treatment time was 7 days (715° C.) or 1 day (825° C.). The metal sulfides which were selectively removed from the catalyst and transported to the cold end of each tube were analyzed for Co, Mo and V. The ratios of the transported metal weights are reported.

| Temperature, °C. | g V/g Co | g V/g Mo |
|---|---|---|
| 715 | 38 | 18 |
| 825 | 9 | 7.5 |

The selectivity of vanadium removal decreases with respect to both cobalt and molybdenum with increasing temperature. The practical upper temperature limit for selective vanadium removal with negligible active metals removal will therefore depend on the degree of vanadium loading. 825° C. constitutes a practical upper temperature limit to the sulfur transport process for light vanadium loadings.

EXAMPLE 8

Catalyst Treated with H₂S

Ten grams of spent Co-Mo catalyst from Amuay was placed in a quartz tube and heated in flowing $H_2S$. The temperature was increased and maintained at 600° after 24 hours of drying at 200° C. The $H_2S$ was passed at 600° C. for 15 days. A small amount of elemental sulfur (~1%) was formed and condensed. The total equivalent amount of sulfur passed as $H_2S$ was 1190 grams of sulfur. Flow rate was 1 cc/sec.

Using the small amount of elemental sulfur formed (10 grams) as representative, a sulfur pressure of only $10^{-3}$ atm was on the catalyst. At this pressure, no vanadium transport occurred and only minor removal of C was observed.

EXAMPLE 9

Recovery of Catalyst Activity

Two samples of catalyst treated as in Example 1 are compared to a sample of fresh Co-Mo catalyst (3% Co and 8% Mo) and to a sample of spent catalyst from Amuay. The catalysts were tested as received. They were subjected to a test for hydrodesulfurization activity based upon 15% dibenzothiophene in tetralene. The test was run at 350° C., at a pressure of 1 atmosphere and a space velocity of 0.05. The results are seen in FIG. C. The recovery of atmospheric hydrodesulfurization activity of DBT is approximately proportional to the surface area recovery. Dibenzothiophene is used as the test material since the compound is analogous to the organosulfur compounds present in naturally occurring petroleums. Therefore, the efficiency of a catalyst to desulfurize this molecule is taken as a satisfactory indication of the ability of a catalyst to desulfurize petroleums. FIG. C shows that sulfur treatment causes about a 50% increase in catalyst activity.

EXAMPLE 10

A sample of fresh Co-Mo catalyst (3% Co, 8% Mo) was run for 16 days on resid to produce partial coking. The sample was subsequently run on dibenzothiophene to establish its HDS activity. The coked catalyst was then regenerated by Sulfur Vapor Transport in a flow system at 500° C. for 2.25 hrs at a sulfur vapor pressure of 0.78 atm using He as the carrier gas. Data regarding carbon removal and catalyst regeneration are tabulated below.

The activity of the catalyst to desulfurize dibenzothiophene was determined at the following reaction conditions:

| Temperature, °F. | 630 |
|---|---|
| Pressure, psig | 600 |
| Flow rate of liquid, cc/hr | 90.0 |
| Dibenzothiophene in liquid, wt. % | 10.0 |
| $H_2$ gas flow rate, SCF/hr | 3.0 |
| Weight of catalyst, grs | 12.0 |
| Reactor volume occupied by catalyst, cc | 15.0 |

The dibenzothiophene conversion and the activity constant defined as shown by the equation below are given for the carbon containing catalyst and the sulfur regenerated catalyst in Table I.

Table I

|  | Coked Catalyst | Regenerated | Fresh Catalyst |
|---|---|---|---|
| Fractional conversion of dibenzothiophene, X | .29 | .4 | .38 |
| activity constant = $\frac{\text{Liquid flow rate}}{\text{Volume of catalyst}}$ hr $\frac{1}{1-X}$ | 2.0 | 3.0 | 2.5 |
| Wt. percent carbon | 11.52 | 6.90 | none |
| Wt. percent vanadium | 0.30 | not determined | none |

EXAMPLE 11

Temperature Dependence of Carbon Removal Selectivity

Catalyst samples treated as in Example 9, except that the sulfur pressure was 0.5 atm. Catalyst temperature, running time, carbon content and cobalt content are listed for two high temperature runs and compared to the initial spent catalyst starting material.

|  | Spent | 4 hr at 700° C. | 1.5 hr at 800° C. |
|---|---|---|---|
| Wt. % carbon | 17.03 | 3.83 | 1.23 |
| Wt. % cobalt | 2.90 | 2.85 | 3.0 |

These data show that Sulfur Vapor Treatment of a spent residfining catalyst at the highest temperature for selective removal of vanadium (800° C.) carbon can be selectively removed without affecting the active metals as monitored by the cobalt content. This catalyst contained only 1.7 wt. % vanadium, so vanadium removal was not as issue in these experiments.

EXAMPLE 12

Effect of Sulfur Treatment on Catalyst Surface Area

Fresh Co-Mo catalyst (3% Co, 8% Mo) was subjected to a sulfurization treatment normal to the preparation of a fresh catalyst for use in a residforming process. The catalyst was sulfided with 10% $H_2S/H_2$ at a pressure of 1 atmosphere for a period of 4 hours at 380° C. After this standard pre-use sulfiding step, the catalyst was treated with sulfur vapor at 600° C. simulating the past use regeneration process. Sulfur pressure was between 0.4 and 0.8 atmospheres. Contact time was 1.3 and 12 hours. The carrier gas was helium. The following table shows the results:

|  | Before $H_2S/H_2$ | After Presulfiding | Treatment 1.3 hrs. | 12 hrs. |
|---|---|---|---|---|
| BET m²/g | 320 | 288 | 285 | 275 |
| PV cc/g | 0.6 | 0.56 | — | 0.54 |

It is seen that standard pre-use presulfiding conditions reduce surface area by 10%. The decontamination sulfurization process at 600° C. does not reduce the surface area any further while port volume also remains unchanged.

PV = Pore Volume of catalyst.

What is claimed is:

1. A process for selectively removing vanadium and carbon contamination from supported metal catalyst systems, which supported metal catalyst systems are selected from the group consisting of Group VI metals, Group VIII metals and bi and tri combinations thereof on a refractory oxide support, which process comprises the steps of:
   a. contacting the contaminated supported metal catalyst system with an elemental sulfur vapor atmosphere at a temperature between 400° to 825° C, and a sulfur pressure of at least 0.10 atmospheres for a time sufficient to selectively form volatile vanadium and carbon sulfides;
   b. removing the volatile vanadium and carbon sulfides from the supported metal catalyst system.

2. A process according to claim 1 wherein vanadium sulfides are selectively removed from contaminated supported metal catalysts.

3. A process according to claim 1 wherein $CS_2$ is selectively removed from contaminated supported metal catalysts.

4. A process according to claim 1 wherein the contacting of the contaminated metal catalyst system with a gaseous sulfurous atmosphere comprises:
   a. establishing a temperature gradient in the system having a temperature difference across the gradient of at least 50° C.;
   b. moving the volatile vanadium and carbon sulfide across the temperature gradient;
   c. condensing the vanadium and carbon sulfide at the low temperature end of the gradient.

5. A process according to claim 4 wherein vanadium sulfides are selectively removed from contaminated supported metal catalysts.

6. A process according to claim 4 wherein $CS_2$ is selectively removed from contaminated supported metal catalysts.

7. A process according to claim 1 wherein the contacting of the contaminated metal catalyst system with a gaseous sulfurous atmosphere comprises:
   a. establishing a uniform temperature in the system;
   b. passing a moving sulfurous atmosphere across the catalyst;
   c. moving the volatile vanadium and carbon sulfides in the moving sulfurous atmosphere.

8. A process according to claim 7 wherein vanadium sulfides are selectively removed from contaminated supported metal catalysts.

9. A process according to claim 7 wherein $CS_2$ is selectively removed from contaminated supported metal catalysts.

10. A process according to claim 1 wherein the contacting of the contaminated metal catalyst system with a gaseous sulfurous atmosphere comprises: establishing a static sulfurous atmosphere over the metal catalyst whereby crystallites of vanadium and carbon sulfide form on the surface of the metal catalyst in the gaseous sulfurous atmosphere thus selectively removing the contaminants from the catalyst pores.

11. A process according to claim 10 wherein vanadium sulfides are selectively removed from contaminated supported metal catalysts.

12. A process according to claim 10 wherein $CS_2$ is selectively removed from contaminated supported metal catalysts.

13. A process according to claim 1 wherein the temperature ranges between 400°–715° C.

14. A process according to claim 1 wherein the temperature ranges between 400°–600° C.

15. A process according to claim 1 wherein the support is alumina.

16. A process according to claim 1 wherein the supported metal catalyst systems are cobalt-molybdenum catalysts.

17. A process for selectively removing vanadium and carbon contamination from supported metal catalysts, which supported metal catalysts are selected from the group consisting of Group VI metals, Group VIII metals and bi and tri combinations thereof on a refractory oxide support, which comprises the steps of:
a. contacting the contaminated supported catalyst system with liquid sulfur at a temperature of between 300°–825° C;
b. forming soluble carbon and vanadium sulfides on the supported metal catalyst,
c. dissolving the soluble carbon and vanadium sulfides in the liquid sulfur;
d. removing the dissolved soluble carbon and vanadium sulfides from the supported metal catalyst system.

18. A process according to claim 16 wherein vanadium sulfides are selectively removed from contaminated supported metal catalysts.

19. A process according to claim 16 wherein $CS_2$ is selectively removed from contaminated supported metal catalysts.

20. A process according to claim 16 wherein the support is alumina.

21. A process according to claim 2 wherein the supported metal catalyst systems are cobalt-molybdenum catalysts.

22. A process for selectively removing lead from supported platinum catalysts which process comprises the steps of:
a. contacting the contaminated platinum catalyst system with an elemental sulfur vapor atmosphere at a temperature between 400° to 600° C and a sulfur pressure of at least 0.10 atm for a time sufficient to selectively form volatile lead sulfides;
b. removing the volatile lead sulfides from the platinum catalyst system.

23. A process according to claim 22 wherein the contacting of the lead contaminated platinum catalyst with a gaseous sulfurous atmosphere comprises:
a. establishing a temperature gradient having a difference across the gradient of at least 50° C.,
b. moving the volatile lead sulfides across the temperature gradient from high temperature to low temperature,
c. collecting the lead sulfides at the low temperature end of the gradient.

24. A process according to claim 22 wherein the contacting of the lead contaminated platinum catalyst with a gaseous sulfurous atmosphere comprises:
a. establishing a uniform temperature in the system;
b. passing a moving sulfurous atmosphere across the platinum catalyst;
c. moving the volatile lead sulfides in the moving sulfurous atmosphere.

* * * * *